United States Patent
Chaput et al.

(10) Patent No.: US 8,337,788 B2
(45) Date of Patent: Dec. 25, 2012

(54) METHOD FOR PREPARING A COLLOIDAL ZIRCONIA SOLUTION

(75) Inventors: Frédéric Chaput, Lyons (FR); Fabien Berit-Debat, Charenton le Pont (FR); Claudine Biver, Charenton le Pont (FR); Noémie Lesartre, Paris (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 282 days.

(21) Appl. No.: 12/594,560

(22) PCT Filed: Apr. 4, 2008

(86) PCT No.: PCT/FR2008/050606
§ 371 (c)(1),
(2), (4) Date: Feb. 9, 2010

(87) PCT Pub. No.: WO2008/139100
PCT Pub. Date: Nov. 20, 2008

(65) Prior Publication Data
US 2010/0144918 A1    Jun. 10, 2010

(30) Foreign Application Priority Data
Apr. 4, 2007 (FR) ................................. 07 54264

(51) Int. Cl.
*C01G 25/02* (2006.01)
*C08K 3/22* (2006.01)

(52) U.S. Cl. .......................... 423/85; 423/608; 524/435

(58) Field of Classification Search .................. 523/116, 523/118; 423/85, 608; 524/435
See application file for complete search history.

(56) References Cited

U.S. PATENT DOCUMENTS

| | | | | |
|---|---|---|---|---|
| 4,784,794 A | * | 11/1988 | Kato | 516/90 |
| 6,376,590 B2 | * | 4/2002 | Kolb et al. | 524/413 |
| 6,656,990 B2 | | 12/2003 | Shustack et al. | 385/129 |
| 7,074,463 B2 | | 7/2006 | Jones et al. | 428/1.1 |
| 7,214,726 B2 | * | 5/2007 | Qian | 523/116 |
| 7,241,437 B2 | | 7/2007 | Davidson et al. | 423/608 |
| 2002/0004544 A1 | | 1/2002 | Kolb et al. | 524/413 |
| 2006/0204679 A1 | | 9/2006 | Jones et al. | 428/1.1 |
| 2008/0306168 A1 | * | 12/2008 | Craig et al. | 514/772.4 |
| 2009/0036556 A1 | * | 2/2009 | Ohmori et al. | 516/90 |

FOREIGN PATENT DOCUMENTS

| | | |
|---|---|---|
| EP | 0229657 | 7/1987 |
| EP | 233343 | 8/1987 |
| JP | 06-321541 | * 11/1994 |
| JP | 06321541 | 11/1994 |
| WO | WO 94/17116 | 8/1994 |

OTHER PUBLICATIONS

Murase and Kato, "Preparation of zirconia whiskers from zirconium hydrozide in sulfuric acid solutions under hydrothermal conditions at 200° C.," *J. Am. Ceram. Soc.*, 84(11):2705-706, 2001.

* cited by examiner

Primary Examiner — Tae H Yoon
(74) Attorney, Agent, or Firm — Fulbright & Jaworski L.L.P.

(57) ABSTRACT

A method for preparing a colloidal solution of non-aggregated zirconia particles, comprising the following steps:
  a) providing a zirconium hydroxide sol,
  b) adding to said sol an inorganic acid according to an [inorganic acid]/[Zr] molar ratio of <0.5,
  c) performing the hydrothermal treatment of said sol, and
  d) recovering the colloidal solution of zirconia particles.

18 Claims, 3 Drawing Sheets

METHOD FOR PREPARING A COLLOIDAL ZIRCONIA SOLUTION

This application is a national phase application under 35 U.S.C. §371 of International Application No. PCT/FR2008/050606 filed 4 Apr. 2008, which claims priority to French Application No. 0754264 filed 4 Apr. 2007. The entire text of each of the above-referenced disclosures is specifically incorporated herein by reference without disclaimer.

The present invention relates to a method for preparing colloidal zirconia solutions and to the incorporation of such colloidal solutions into various matrices such as for scratch-resistant and/or abrasion-resistant coatings, for ocular glasses or ophthalmic substrates, especially for ocular glasses.

It is well known especially in the ocular glass field to use inorganic colloids in scratch-resistant and/or abrasion-resistant coatings for improving the surface properties of organic glasses and/or for modifying the refractive index thereof.

Such colloids are also used in antireflective layers resulting from a sol/gel deposition, as well as in impact-resistant primers.

Zirconia or zirconium oxide is one of the known colloids.

Colloidal fillers such as colloidal silica or inorganic oxides such as titanium dioxide, zirconium oxide, tin oxide or antimony oxide, with high refractive index, are used in protective coatings for ocular glasses. Due to their presence, the hardness of the epoxysilane matrix may be reinforced and/or the refractive index be increased.

To ensure coating transparency and avoid light diffusion, colloids which are small and do not form clusters are required.

This type of fillers may be incorporated into the coating at high content levels, i.e. up to about 50 to 60% by weight of the coating dry matter.

Various methods for synthesizing zirconia-based colloids are known.

Generally speaking, such synthesis remains particularly complicated.

It is first technically problematic to find a method enabling to obtain in a manner that is reproducible small particle sizes or nanoparticles, that is to say particles that are less than 50 nm, preferably less than 20 nm.

A second technical problem to be solved consists in avoiding the clustering of such particles.

In this respect, clustering should be avoided not only during the preparation of the sol but also upon incorporation of the same into a polymer matrix. The patent EP233343 describes the preparation of sols comprising such clusters, which may be interesting as reinforcing fillers in polymers, but which sizes are not suitable for being used in the ophthalmic field.

Zirconia-based colloidal solutions should be temporally stable.

They should be compatible to many types of polymers such as ophthalmic lens substrates, sol/gel coatings, (meth)acrylate or thio(meth)acrylate photopolymerizable coatings, primers such as acrylic or polyurethane latexes.

The patent application US 2002/004544 describes a method for synthesizing a zirconia-based sol in an aqueous phase, which particle average size is less than 20 nm, consisting in providing an aqueous solution comprising a zirconium polyether acid salt and hydrolyzing this salt under hydrothermal conditions at a temperature and under a pressure enabling the crystallization.

A (mainly) cubical and/or a tetragonal, monoclinic, zirconia-based sol is obtained.

The present invention provides an alternative solution to this method, with many advantages which will become apparent from the following description.

The hereabove mentioned technical problems are solved by a method for preparing a colloidal solution of non-aggregated zirconia particles, comprising the steps consisting in:
 a) providing a zirconium hydroxide suspension, preferably an aqueous suspension,
 b) adding to said suspension an inorganic acid according to an [inorganic acid]/[Zr] molar ratio<0.5,
 c) hydrothermally treating said suspension,
 d) recovering the colloidal solution of zirconia particles.

Preferably, the zirconium hydroxide suspension is obtained by performing a basic treatment on a zirconium oxychloride aqueous solution, preferably by adding an ammonia solution.

The zirconium hydroxide suspension is obtained by separating and purifying a zirconium hydroxide precipitate resulting from said basic treatment, followed with a redispersion in an aqueous medium of said precipitate.

Said purification is preferably performed through successive redispersion and filtration processes in deionized water.

The pH value of the zirconium hydroxide suspension is preferably of about 7 in step a).

An essential element of the invention consists in carrying out a hydrothermal treatment of the zirconium hydroxide suspension having such an acidic content that the [inorganic acid]/[Zr] molar ratio is less than 0.5 and does range from 0.01 to less than 0.5, preferably from 0.05 to 0.2. If proceeding at higher acidic values or in a basic medium, either clusters or particles with poorly controlled size are obtained.

To be mentioned as inorganic acids to be suitably used are hydrochloric acid and nitric acid, preferably hydrochloric acid.

The hydrothermal treatment is preferably performed in an autoclave at a temperature ranging from 150 to 200° C., and preferably of about 165° C., for a time period ranging from 3 hours to 3 days.

The resulting sol comprises a combination of tetragonal (mainly) and monoclinic zirconia.

The dry matter content of the zirconia-based colloidal solution does preferably vary from 3 to 10%, preferably from 4 to 7% by weight.

Preferably the method comprises an additional grafting step onto the zirconia particle surface of compounds carrying moieties that perform a steric and/or an electrostatic repulsion between said zirconia particles.

Such compounds carrying moieties that perform a steric and/or an electrostatic repulsion preferably comprise a carboxylic acid, a phosphonic or a sulfonic acid function ensuring their grafting.

Preferably the method for preparing a zirconia-based sol comprises an additional step of adding a reactive solvent.

A zirconia particle-containing composition is then obtained, which also forms part of the invention.

Preferably the reactive solvent is introduced by redispersing the zirconia particles, initially in an aqueous medium within the reactive solvent.

As used herein, a reactive solvent means a monomer with a good affinity towards zirconia nanoparticles enabling the good dispersion thereof, and also with an acrylic or a methacrylic function enabling the incorporation thereof into the thermosetting network through photopolymerization.

Preferably, the alcohol function is used to make sure the redispersion does occur.

This reactive solvent is preferably hydroxyethyl methacrylate (HEMA).

HEMA is a good solvent for the zirconia redispersion: the alcohol function of the molecule does ensure the nanoparticle good dispersion, whereas the methacrylate function makes it possible to incorporate the molecule into a thermosetting matrix.

Preferably, the zirconia particle-containing composition comprises at least one additional monomer with at least two functions selected from acrylate, methacrylate, thioacrylate and thiomethacrylate functions.

Preferably, the additional monomer is a bisphenol-A 4 ethoxylated dimethacrylate or BMTES.

Substrates made of organic glass into which zirconia particles resulting from sols obtained according to the method of the invention may be suitably introduced, include poly(alkyl) acrylate substrates, especially those obtained by polymerizing alkyl methacrylates, in particular $C_1$-$C_4$ alkyl methacrylates, such as methyl(meth)acrylate and ethyl(meth)acrylate, polyethoxylated aromatic (meth)acrylates such as polyethoxylated bisphenolate dimethacrylates, allyl derivatives such as aliphatic or aromatic, linear or branched, polyol allyl carbonates, thio-(meth)acrylates, polythiourethane substrates, polycarbonate (PC) substrates and polyepisulfide substrates.

Recommended substrates include those obtained by polymerizing polyol allyl carbonates amongst which ethyleneglycol bis allyl carbonate, diethylene glycol bis 2-methyl carbonate, diethyleneglycol bis(allyl carbonate), ethyleneglycol bis(2-chloro allyl carbonate), triethyleneglycol bis(allyl carbonate), 1,3-propanediol bis(allyl carbonate), propylene glycol bis (2-ethyl allyl carbonate), 1,3-butylenediol bis(allyl carbonate), 1,4-butenediol bis(2-bromo allyl carbonate), dipropyleneglycol bis(allyl carbonate), trimethyleneglycol bis(2-ethyl allyl carbonate), pentamethyleneglycol bis(allyl carbonate), and isopropylene bis phenol-A bis(allyl carbonate).

Also recommended are those substrates obtained by polymerizing thio(meth)acrylic monomers such as those described in the French patent application FR-A-2 734 827. Of course said substrates may be obtained by polymerizing mixtures of the hereabove mentioned monomers.

Preferred substrates are those resulting from a photopolymerization.

The zirconia particle content of the substrates may vary within a broad range depending on the expected properties.

Typically, the zirconia particle content may vary from 0.1 to 50% by weight as related to the polymer+particle total weight, preferably from 10 to 40%.

The zirconia colloidal solutions may also be incorporated into coating compositions of the sol/gel, abrasion-resistant or antireflective type.

The sol is prepared from at least one alkoxysilane such as an epoxysilane, preferably a trifunctional one, and/or a hydrolysate thereof, for example obtained by hydrolysis by hydrochloride solution HCL.

Following the hydrolysis step, which duration does generally range from 2 to 24 hours, preferably from 2 to 6 hours, catalysts may be optionally added. A surface active agent is preferably also added to improve the optical quality of the deposit.

Preferred epoxyalkoxysilanes comprise an epoxy moiety as well as three alkoxy groups, the latter being directly bound to the silicon atom.

A preferred epoxyalkoxysilane may be an alkoxysilane carrying a β-(3,4-epoxycyclohexyl) group, such as β-(3,4-epoxycyclohexyl)ethyltrimethoxysilane.

Particularly preferred epoxyalkoxysilanes have the following formula (I):

wherein:
$R^1$ is an alkyl group with from 1 to 6 carbon atoms, preferably a methyl or an ethyl group,
$R^2$ is a methyl group or a hydrogen atom,
a is an integer between 1 and 6,
b is 0, 1 or 2.

γ-glycidoxypropyl-triethoxysilane or γ-glycidoxypropyl-trimethoxysilane are examples of such epoxysilanes.

γ-glycidoxypropyl-trimethoxysilane will be preferably used.

Suitable examples of epoxysilanes also include epoxydialkoxysilanes such as γ-glycidoxypropylmethyl dimethoxysilane, γ-glycidoxypropylmethyl diethoxysilane and γ-glycidoxyethoxypropyl methyldimethoxysilane.

However epoxydialkoxysilanes are preferably used at lower amounts than the previously mentioned epoxytrialkoxysilanes.

Other preferred alkoxysilanes have the following formula:

wherein $R^3$ and $R^4$ are selected from alkyl, methacryloxyalkyl, alkenyl and aryl groups, either substituted or not (examples of substituted alkyl groups include halogenated alkyl groups, in particular with chlorine or fluorine); Z is an alkoxy, alkoxyalkoxy or acyloxy group; c and d are 0, 1 or 2, respectively; and c+d are 0, 1 or 2. This formula includes the following compounds: (1) tetraalkoxysilanes, such as methyl silicate, ethyl silicate, n-propyl silicate, isopropyl silicate, n-butyl silicate, sec-butyl silicate, and t-butyl silicate, and/or (2) trialkoxysilanes, trialkoxyalkoxylsilanes or triacyloxysilanes, such as methyl trimethoxysilane, methyl triethoxysilane, vinyl trimethoxysilane, vinyl triethoxysilane, vinyl trimethoxyethoxysilane, vinyl triacetoxysilane, phenyl trimethoxysilane, phenyl triethoxysilane, γ-chloropropyl trimethoxysilane, γ-trifluoropropyl trimethoxysilane, methacryloxypropyl trimethoxysilane, and/or (3) dialkoxysilanes, such as: dimethyl dimethoxysilane, γ-chloropropyl methyldimethoxysilane and methylphenyl dimethoxysilane.

When using an alkoxysilane hydrolyzate, this one is prepared in a manner that is known per se.

The methods that are described in the European and American patents EP 614957 and U.S. Pat. No. 4,211,823 resp. may be used.

The silane hydrolysate is prepared by adding water or a hydrochloric acid or sulfuric acid solution to the silane(s). It is also possible to perform the hydrolysis without adding any solvent, but just using the alcohol or the carboxylic acid formed upon the reaction between water and the alkoxysilane(s). These solvents may also be replaced with other solvents, such as alcohols, ketones, alkyl chlorides and aromatic solvents.

Hydrolyzing with a hydrochloric acid aqueous solution is preferred.

Apart from alkoxysilanes, the solution may also comprise other oxide particles such as zirconia particles.

Examples of such particles include silica particles or particles with a high refractive index such as titanium dioxide particles, antimony oxide, tin, tantalum and niobium particles.

To the previously prepared sol/gel composition is added the zirconia-based colloidal solution in an aqueous solution or in an organic solution, preferably in an alcohol solution, stabilized with ethanol, so as to obtain the expected filler weight ratio (ranging preferably from 0.1% to 39% by weight as related to the theoretical dry matter weight).

The sol/gel composition preferably comprises at least one curing catalyst.

Examples of suitable curing catalysts include, inter alia, aluminium-based compounds, and especially aluminium-based compounds selected from:

aluminium chelates, and compounds of formula (III) or (IV), as detailed hereunder:

$$Al(OCR)_n(OR')_{3-n} \quad (III)$$
$$\phantom{Al(OCR)_n}\overset{\|}{O}$$

$$(R'O)_{3-n}Al(OSiR''_3)_n \quad (IV)$$

wherein:
R and R' are linear or branched-chain alkyl groups, comprising from 1 to 10 carbon atoms,
R" is a linear or branched-chain alkyl group, comprising from 1 to 10 carbon atoms, a phenyl group, or a group $$-OCR$$
$$\overset{\|}{O}$$

wherein R is as defined hereabove, and n is an integer between 1 and 3.

As is known, an aluminium-based chelate is a compound resulting from the reaction of an alcoholate or an aluminium acylate with sequestering agents that are free of nitrogen and sulfur and containing oxygen as a coordinating atom.

The aluminium chelate is preferably chosen from compounds of formula (V):

$$AlX_vY_{3-v} \quad (V)$$

wherein:
X is an OL group, wherein L is a $C_1$ to $C_{10}$-alkyl group,
Y is at least one ligand from a compound of formula (1) or (2):

$$M^1COCH_2COM^2 \quad (1)$$

$$M^3COCH_2COOM^4 \quad (2)$$

wherein:
$M^1$, $M^2$, $M^3$, and $M^4$ are $C_1$ to $C_{10}$-alkyl groups,
and v is 0, 1 or 2.

Examples of compounds of formula (V) include aluminium acetyl acetonate, aluminium ethylacetoacetate bisacetylacetonate, aluminium bisethylacetoacetate acetylacetonate, aluminium di-n-butoxide monoethylacetoacetate and aluminium dipropoxide mono-methylacetoacetate.

As compounds of formula (III) or (IV) those will be preferably selected wherein R' is an isopropyl or an ethyl group, and R and R" are methyl groups.

It will be considered as being particularly advantageous to use preferably as a curing catalyst for the composition an aluminium acetylacetonate, in an amount ranging from 0.1 to 5% by weight of the composition total weight.

Any conventional deposition method may be used for depositing the coating.

Dip-coating is to be mentioned, a method according to which the substrate to be coated is dipped into a bath of the composition, or spin-coating.

The sol is preferably deposited by "spin coating", that is to say by centrifugation, onto substrates, for example an ORMA® (Essilor) substrate, based on poly(diethylene glycol bisallyl carbonate). The deposition rate does range from 100 rpm to 3000 rpm, preferably from 200 rpm to 2000 rpm.

The varnishes are then cured, preferably by a heat treatment performed in an oven for a time period ranging from 1 to 5 hours, typically for 3 hours at a temperature between 80° C. and 120° C.

The resulting films are typically 1-10 μm thick, preferably 2-5 μm thick.

The zirconia-based solutions resulting from the method of the invention may also be incorporated into an adhesion primer solution or into an impact-resistant primer solution.

Preferred primer compositions include polyurethane-containing thermoplastic compositions, such as those described in the Japanese patents N° 63-141001 and 63-87223, poly (meth)acrylic primer compositions, such as those described in the U.S. Pat. No. 5,015,523, polyurethane-containing thermosetting compositions, such as those described in the European patent N° EP-0404111 and poly(meth)acrylic or polyurethane latex-containing compositions, such as those described in the patent specifications U.S. Pat. No. 5,316,791 and EP-0680492.

Preferred primer compositions are polyurethane-containing and latex-containing compositions, especially polyurethane-type latexes.

Poly(meth)acrylic latexes are copolymer latexes mainly composed of a (meth)acrylate, such as for example an ethyl or a butyl (meth)acrylate or of a methoxy or an ethoxyethyl, with a generally minor amount of at least one another comonomer, such as a styrene for example.

Preferred poly(meth)acrylic latexes are acrylate-styrene copolymer latexes.

Such acrylate-styrene copolymer latexes are commercially available from the ZENECA RESINS company under the trade name NEOCRYL®.

Polyurethane type latexes are generally known and commercially available.

As an example, polyester unit-containing polyurethane-type latexes may be mentioned.

Such latexes are also marketed by the ZENECA RESINS company under the trade name NEOREZ® and by the BAXENDEN CHEMICAL company under the trade name WITCOBOND®.

Combinations of such latexes may also be used in the primer compositions, especially of polyurethane-type and poly(meth)acrylic-type latexes.

These primer compositions may be deposited onto the optical article sides by dipping or by spin-coating, thereafter dried to a temperature of at least 70° C. and up to 100° C., preferably of about 90° C., for a time period ranging from 2 minutes to 2 hours, typically of about 15 minutes, to form primer layers having thicknesses after curing of from 0.2 to 2.5 μm, preferably of from 0.5 to 1.5 μm.

The colloid dry matter content (solid particle weight) may preferably vary from 0.1 to 65%, preferably from 0.1 to 50%.

The following description does refer to the appended figures, which illustrate respectively.

The following examples are intended to illustrate the present invention without being imitative.

EXAMPLES

Example 1

To a zirconium oxychloride aqueous solution (1 l, concentration 0.5M) are added 335 ml of an ammonia solution (concentration 3M). A zirconium hydroxide precipitate does appear. The precipitation does occur under intense stirring by means of a homogenizer-type mixer ("Ultraturax type"). Thereafter the precipitate is recovered by filtration onto a sintered glass (porosity #4) or by centrifugation. The thus obtained wet cake is purified by alternate redispersion (in distilled water under vigorous stirring) and filtration (or centrifugation) processes. Once the washing water pH value has become stable (around pH=7) the purification is achieved. As observed by the transmission electron microscopy of the thus purified zirconium hydroxide precipitate, an amorphous product is provided (according to the electron diffraction pattern—not shown) which elementary unit size can be hardly evaluated.

The purified zirconium hydroxide cake is lastly redispersed into a given amount of water. Controlling the acidity of the hydrothermal synthesis medium is performed at this stage of the preparation by adding an acid or a base to the redispersion solution. To ensure a perfect dispersion of the zirconium hydroxide particles, the solution is first prepared under vigorous stirring, then under sonication. The thus obtained "milk" is introduced into a PTFE beaker. The whole is then placed in an autoclave to carry out the hydrothermal treatment. All the treatment long the solution is being stirred. At the end of this step, a zirconia aqueous colloidal solution is obtained. It comes as a slightly blue-colored opalescent solution. In this apparently stable solution a small deposit forms as time goes on. To significantly improve the sol stability, it becomes then necessary to reduce the solution's ionic charge, through a dialysis for example. After this step and sonication, a stable sol is obtained, which dry matter is about 7%.

The reference colloidal solution is prepared under following experimental conditions:

Zirconium concentration in the hydroxide solution: 0.5 mol/l.
HCl/Zr mole ratio in the hydroxide solution: 0,1.
Temperature and process time (autoclave) are respectively: 165° C. and 6 hours.
The stability of the sol obtained is improved by dialyzing the same with a Cellophane membrane for 7 days.
The characteristics of the sol obtained are as follows:
pH=4.5; zeta potential comprised between 30 and 40 mV (isoelectric point: pH=7.5).
Dry matter: of about 6%.

Figure 1:
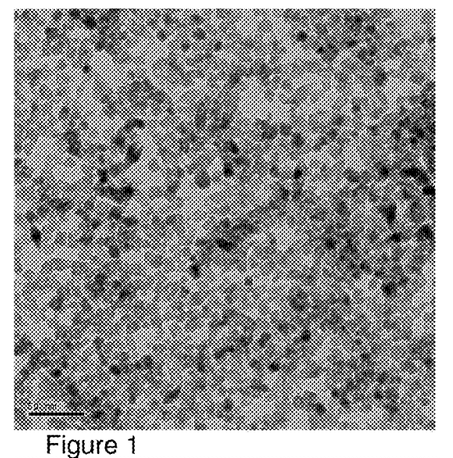
FIGS. 1 to 3:
Zirconia particles in the colloidal solution of the invention of the corresponding example 1 shown by TEM (transmission electron microscopy).
Figure 2:
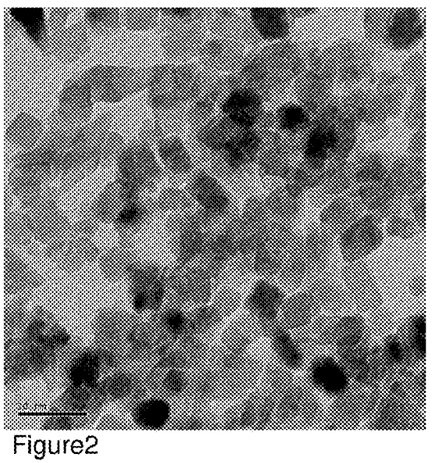
Figure 3:
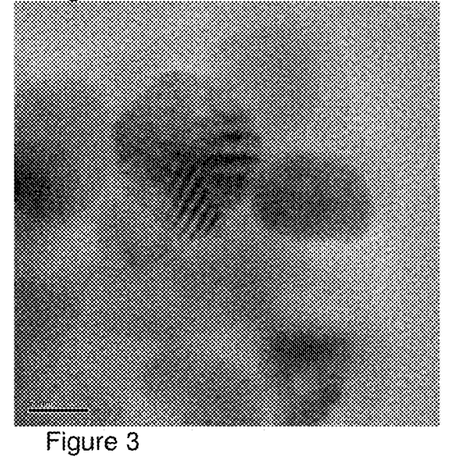

The particles are shown with different observing magnifications.
Particle size: approx. 10 nm (FIGS. 1, 2); monocrystalline particles (FIG. 3).

Example 2 (Comparative)

Figure 4:
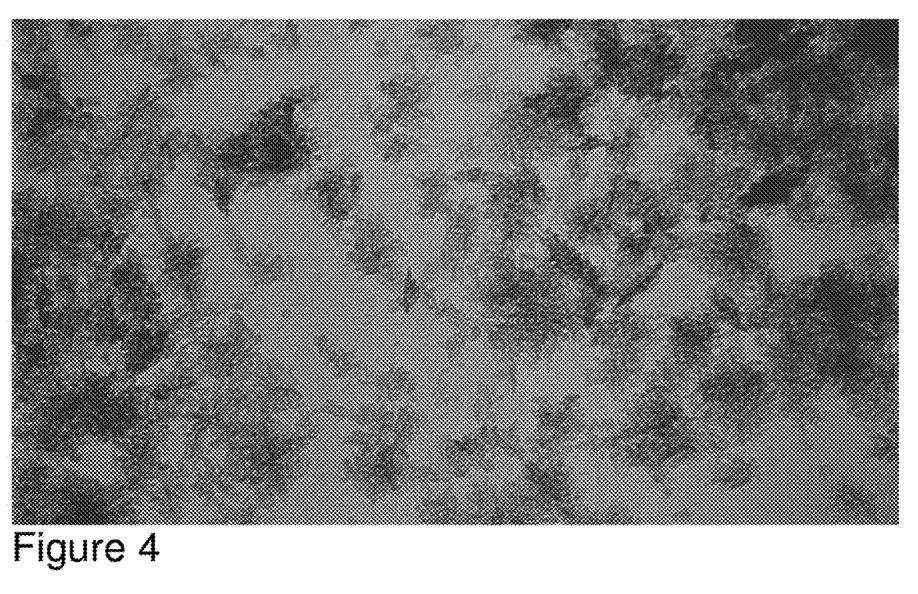
FIG. 4:
Zirconia particles in the colloidal solution of the (comparative) example 2 shown by transmission electron microscopy (TEM).

The method of example 1 is repeated, except that the HCL/Zr mole ratio is 1.
It can be clearly observed on FIG. 4 that the zirconia particles present in the form of clusters, which is detrimental to the optical properties of the sol.

Example 3

Methacrylic Acid Grafting 60 g of reference sol (dry matter of about 5%).
2.16 g of methacrylic acid.
The mixture is raised to 50° C. for 1 h, after which the treated zirconia does precipitate. The precipitate is recovered by centrifugation. Part of the methacrylic acid in excess is removed during this step. To get the zirconia fully free of the unreacted acid, the precipitate should be suspended in hexane. After a new centrifugation and removal of the supernatant, the precipitate is easily redispersed in ethanol. To eliminate any trace hexane, the solvent (ethanol-trace hexane combination) of the colloidal solution is then removed on a rotating evaporator. The resulting solid is definitively dispersed within a given amount of ethanol or acetone to form a stable colloidal solution having a dry matter content greater than 30%. An infrared spectrum of the thus transformed zirconia (not shown) makes it possible to control that the grafting did succeed.

Example 4

Fluorophenyl Acetic Acid Grafting 625 g of reference sol (dry matter of about 5%).
20 g of fluorophenyl acetic acid.
The mixture is raised to 70° C. for 1 h, after which the treated zirconia does precipitate. The precipitate is recovered by centrifugation. Part of the fluorophenyl acetic acid in excess is removed during this step. To get the zirconia fully free of unreacted acid, the precipitate should be suspended in methanol et be recovered by centrifugation. After two similar washing operations, the precipitate is finally redispersed in N-methyl-2-pyrrolidone (NMP) to provide a stable colloidal solution having a dry matter content of more than 30%.

Example 5

Methoxyethoxyethoxyacetic Acid Grafting 50 g of reference sol (dry matter of about 5%).
3.7 g of methoxyethoxyethoxyacetic acid.
The mixture is raised to 70° C. for 1 h, after which the treated zirconia still remains perfectly dispersed. So as to remove any acid in excess, the colloidal solution is added dropwise into a substantial volume of acetone. Zirconia then flocculates within a couple of hours. After removal of the supernatant, the modified zirconia is dried under vacuum (T=40° C.). The resulting powder is redispersed in a mixture of 4-hydroxy-4-methyl-2-pentanone and water (volume ratio=2). The dry matter represents about 30%.

Example 6

Nitrobenzoic Acid Grafting 10 g of reference sol (dry matter of about 5%).
0.24 g of nitrobenzoic acid dissolved in 6 ml methanol.

The mixture is raised to 70° C. for 1 h, after which the treated zirconia does precipitate.

The precipitate is recovered by centrifugation. Part of the nitrobenzoic acid in excess is removed during this step. To get free the zirconia of the unreacted acid, the precipitate is suspended in methanol and recovered by centrifugation. Le resulting product is redispersed in acetone under sonication. The thus prepared colloidal solution is thixotropic in nature and has a dry matter content of more than 10%.

Example 7

Ter-Butyl Phosphonic Acid Grafting 10 g of reference sol (dry matter of about 5%).
0.21 g of ter-butyl phosphonic acid.

The mixture is raised to 80° C. for 4 h, after which the treated zirconia does precipitate. The precipitate is recovered by centrifugation. Part of the ter-butyl phosphonic acid in excess is removed during this step. After having been washed with distilled water and then centrifuged, the precipitate is dried under vacuum, and thereafter redispersed within NMP.

Example 8

(2-methoxyethoxy)ethyl phosphonic acid grafting 10 g of reference sol (dry matter of about 5%).
0.38 g of (2-methoxyethoxy)ethyl phosphonic acid
The mixture is raised to 80° C. for 4 h, after which the treated zirconia does precipitate. The precipitate is recovered by centrifugation.

Examples of Zirconia Incorporated into Varnishes and Substrates

Incorporations of non functionalized zirconia nanoparticles into photopolymerisable thin layers and substrates have been performed.

The incorporation method does occur in two steps:
1. Redispersion of the nanoparticles, initially within DI water, in a reactive solvent through solvent exchange by evaporating water by means of the rotary evaporator.
2. Polymerization, using an ultraviolet radiation or a thermal process, by reacting the reactive solvent with monomers, thus ensuring the crosslinking of the network.

Thus transparent varnishes were obtained, exhibiting a nanoparticle content of 29% by weight. The refractive index of the thin layer from 1.50-1.53 for the reference matrix without nanoparticles (see Table 3) raised to approx. 1.60 with 29% by weight of nanoparticles.

Photopolymerizable substrates were obtained with a good zirconia nanoparticle dispersion rate of 20%.

A. Redispersion of the Zirconia Nanoparticles within a Methacrylic Monomer:

The zirconia-based sol that is used is the same as in example 1.

Zirconia nanoparticles, initially in water, are redispersed within a reactive solvent through evaporation using a rotary evaporator (Rotavap):

Zirconia nanoparticles in the reactive solvent should have a 30% concentration.

Procedure:
Material required (for 50 g of end product, with a $ZrO_2$ dry matter content of 35.75% by weight in HEMA):
*1 Rotary evaporator fitted with a heat-regulated bath and a pressure controller. (apparatus used: reference: ROTAVAPOR R-200 made by the BUCHI company)
*1 L-flask for the evaporator
Reactants used/amounts used:
*Zirconia nanoparticles dispersed within DI water=309.24 g;
(dry matter at 160° C.=6.15%, m $ZrO_2$=19.02 g, m $H_2O$=290.22 g)
*Hydroxyethyl methacrylate 97% (HEMA)=34.17 g
Weighting and mixing: Duration 15 minutes 1. The ROTAVAPOR heat-regulated (DI water) bath is preheated at 60° C.
2. 309.24 g of the zirconia-based aqueous solution are added to a flask.
3. Then 34.17 g HEMA are further added to the flask.
4. The flask is mounted on the ROTAVAPOR and dipped into the bath regulated at 60° C.
5. The flask is put into rotation to the ¾ of its maximum speed.

Evaporation of the water contained in the flask: Duration 2h30

1. Vacuum is made gradually in the flask and is stabilized when a tremor just becomes perceptible on the surface of the liquid.
2. Once the liquid-vapor equilibrium has been stabilized (no more bubbles on the surface), the pressure in the flask is decreased.
3. Steps 1 and 2 are repeated until a 68 mbar-pressure in the flask is obtained.
4. After 2h30, wipe and weight the flask and calculate the residual water weight.
5. If some water remains present, proceed step 3 until at most 2% by weight of residual water remain. (the control of the purity is effected via the control of the weight).

The solutions obtained are given in Table 1.

TABLE 1

| | HEMA | |
|---|---|---|
| $ZrO_2$ % in ($ZrO2$ + HEMA) | 35.8% | 42.4% |
| Stability | No precipitate | No precipitate |
| Appearance | Handleable translucent viscous gel | Hardly redispersible viscous gel |

The HEMA solution comprising 35.8% of zirconia is stable, that is to say it does not cause any precipitate formation. The 42.5% zirconia solution does produce a non handleable gel. However, such solution is stable.

B. $ZrO_2$-Based Methacrylic Varnish Formulation:

In the following examples, the formation of a thermosetting three-dimensional network is obtained by adding a dysfunctional methacrylic reactant NS140 (bisphenol A 4 ethoxylated di(meth)acrylate) and BMTES enables to increase the refractive index of the reference matrix and to crosslink the system so as to improve the mechanical and the chemical resistance thereof.

BMTES
(bismethyl thiomethacrylate)

Moreover, BMTES ($n_f$=1.57) has a higher liquid index as compared to NS140 ($n_f$=1.54), which makes conceivable to limit the index discrepancy between the nanoparticles and the organic matrix.

1. Varnish Formulations:
(All percentages do refer to a weight ratio.)

TABLE 2

|  | Varnish 1 | Varnish 2 | Varnish 3 |
|---|---|---|---|
| Tested organic matrices | HEMA (100%) | HEMA/NS140 (72%/28%) | HEMA/BMTES (72%/28%) |
| % Zirconia (/matrix + zirconia) |  | 29% |  |
| Mixing steps | HEMA + ZrO2 (ES = 35.8%) + HEMA + photoinitiator: Irg500 + HMP | HEMA + ZrO2 (ES = 35.8%) + NS140 + Irg500 + HMP | HEMA + ZrO2 (ES = 35.8%) + BMTES + Irg500 + HMP |
| Mixing conditions |  | amb. T under stirring Sonication 10% for 1 minute every 5 s. |  |
| Appearance | Translucent stable liquid | Translucent and viscous stable liquid |  |

The weight percentage of the photoinitiator, Irgacure 500 (CIBA) accounts for about 5% of the composition of the polymerized matrix (without HMP).

2. Deposition and Polymerization of the Varnishes:

Each of the varnishes 1 to 3 hereabove is deposited by spin-coating onto an ORMA® ophthalmic lens (diethylene glycol diallylcarbonate polymer), power −2 diopters.

Deposition Parameters:
Spin-Coating:
Time: 30 seconds
Acceleration: 500 rpm/s
Speed: varying depending on the viscosity of the sample.
Polymerization:
Four UV LH6 Fusion
BulbH/height 11.5 cm
Power of the lamp: 100%
Belt speed (Set): 22
Number of runs: 4

3. Optical Properties of the Hybrid (Organic/Inorganic) Photopolymerizable Varnishes Obtained.

Pure, Organic Matrix with No Zirconia (Reference):

TABLE 3

| Tested varnishes | HEMA (100%) | HEMA/NS140 (72%/28%) | HEMA/BMTES (72%/28%) |
|---|---|---|---|
| % Zirconia (/matrix + zirconia) |  | 0 |  |
| % HMP (/matrix + zirconia + HMP) | 0 | 0 | 0 |
| Spin speed (revolution/minute) | 300 | 1500 | 1000 |
| Thickness in micrometer (Eotech) | 2 | 1.7 | 2.7 |
| Liquid index at 19° C. | 1.46 | 1.48 | 1.49 |
| Index (Eliometer) | 1.50 to 1.51 | 1.52 | 1.53 |
| Appearance | Transparent | Transparent | Transparent |

Varnish Composition with 29% of Zirconia:

TABLE 4

|  | Example 9 Varnish 1 |  | Example 10 Varnish 2 |  | Example 11 Varnish 3 |
|---|---|---|---|---|---|
| Composition | HEMA (100%) |  | HEMA/NS140 (72%/28%) |  | HEMA/BMTES (72%/28%) |
| % Zirconia (/matrix + zirconia) |  |  | 29 |  |  |
| % HMP (/matrix + zirconia + HMP) | 0 | 30 | 30 | 50 | 30 |
| Spin speed (revolution/minute) | 4000 | 500 | 1500 | 500 | 1000 |
| Thickness in micrometer (Eotech) | 2 to 2.3 | 2 to 2.3 | 1.7 to 2.6 | 2.33 | 2 |
| Index (Eliometer) | 1.60 to 1.61 | 1.60 to 1.61 | 1.57 to 1.59 | 1.57 to 1.59 | 1.59 to 1.60 |
| Appearance | Transparent | Transparent | Transparent | Transparent | Transparent |

HMP (4-hydroxy-4-methyl-2-pentanone/Cas: 123-42-2) is a solvent used for adjusting the viscosity of the mixture and optimizing the thickness of the varnish deposited by centrifugation. The solvent is fully evaporated at the time of varnish polymerization.

The mixture liquid index is measured using a heat-regulated liquid refractometer (Reference: ATAGO 3T).

The thickness and the index of the polymerized varnish is evaluated by an EOTECH apparatus through the reflection of the light against the substrate.

It appears that for a thin HEMA-based layer a zirconia rate of 29% makes the refractive index of such thin layer rise from 1.50 to 1.60. The varnish still remains transparent with an acceptable diffusion level.

II. Incorporation of Zirconia into 2 mm-Thick Organic Matrices (Substrates):
A. UV Photopolymerizable Methacrylic Substrates:
1. Formulation:
(All percentages do refer to a weight ratio.)

TABLE 5

| Tested matrices | HEMA (100%) | HEMA/BMTES (72%/28%) |
|---|---|---|
| % Zirconia (/matrix + zirconia) | 20% | |
| Mixing steps | HEMA + ZrO2 (ES = 35.8%) + HEMA + Irgacure CGI819 (CIBA) | HEMA + ZrO2 (ES = 35.8%) + BMTES + CGI819 |
| Mixing conditions | amb. T under stirring Sonication 10% for 1 minute every 5 s. | |
| Appearance | Translucent stable liquid | |

The CGI 819 photoinitiator percentage is 0.1%.
2. Polymerization Parameters:
2 mm-thick biplane silicone moulds
Four UV IST (iron-dotted lamp)
Average power of the lamps: 34 mW/cm$^2$

TABLE 6

| | Example 12 HEMA | Example 13 HEMA/BMTES (72/28) |
|---|---|---|
| ZrO$_2$ | 20% | 20% |
| Conversion of the methacrylate bonds by IR spectroscopy (band follow-up at 6200 cm$^{-1}$) | 100% conversion C=C | 94% conversion C=C |
| Appearance | Translucent, diffusing | Translucent, diffusing |

3. Scanning Transmission Electron Microscope (Tem) Analyses were Performed on a Hybrid Matrix (HEMA+BMTES+ZrO$_2$).

Figure 5:
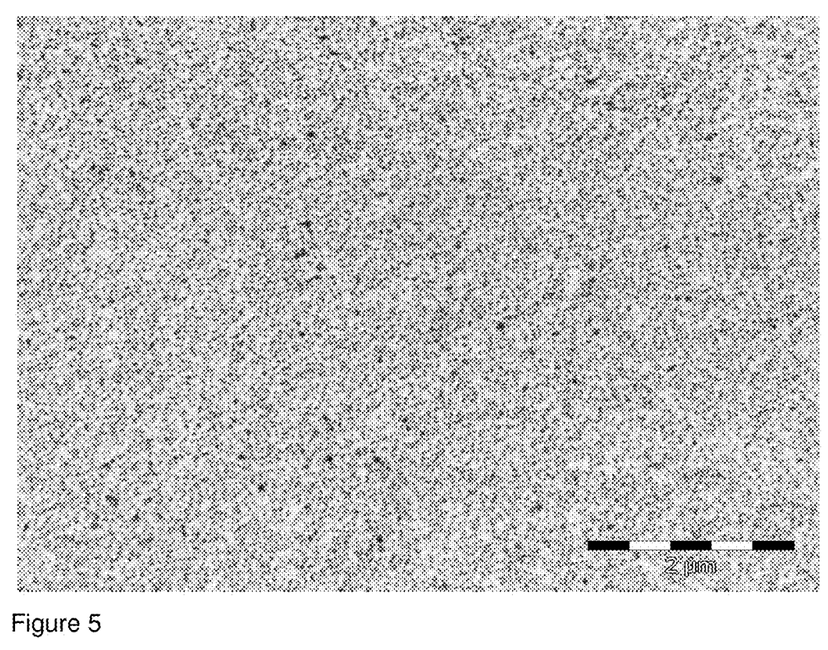
FIGS. 5 and 6:
Zirconia particles within a polymer matrix corresponding to the example 13.
Figure 6:
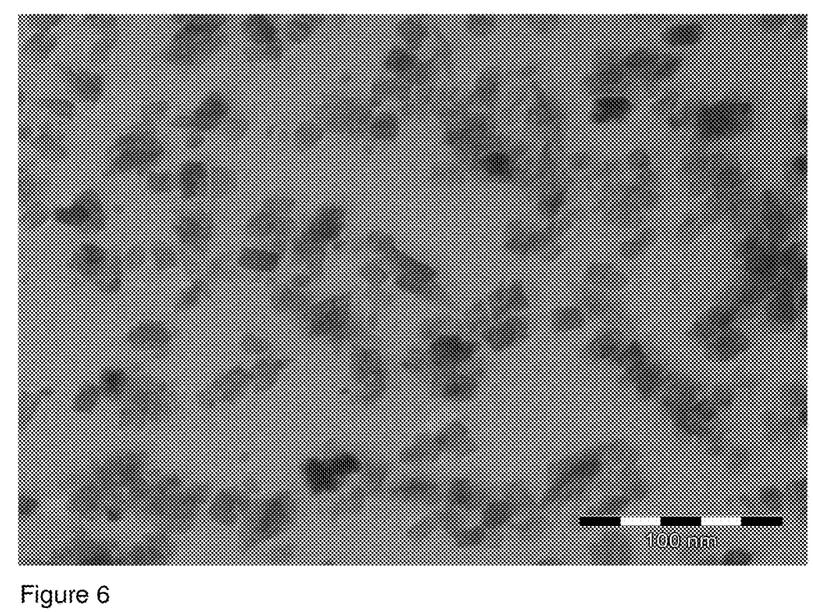

The zirconia nanoparticles are well dispersed throughout the HEMA+BMTES organic matrix, as can be seen on FIGS. 5 and 6 (different magnifying powers). The nanoparticle average size measured is 15 nm.

The invention claimed is:

1. A method for preparing a colloidal solution of non-aggregated zirconia particles, comprising:
   a) providing a zirconium hydroxide suspension,
   b) adding to the suspension an inorganic acid so that said suspension has an [inorganic acid ]/[Zr] molar ratio ranging from 0.05 to 0.2,
   c) hydrothermally treating the suspension, and
   d) recovering the colloidal solution of zirconia particles.

2. The method of claim 1, wherein the zirconium hydroxide suspension is an aqueous suspension.

3. The method of claim 2, wherein the zirconium hydroxide suspension is obtained by conducting a basic treatment of a zirconium oxychloride aqueous solution.

4. The method of claim 3, wherein the basic treatment comprises a step of adding to the zirconium oxychloride solution an ammonia solution.

5. The method of claim 3, wherein the zirconium hydroxide suspension is obtained by separating and purifying a zirconium hydroxide precipitate resulting from the basic treatment, followed with a redispersion in an aqueous medium of the precipitate.

6. The method of claim 5, wherein the purification is performed through successive redispersion and filtration processes in deionized water.

7. The method of claim 1, wherein the pH value of the zirconium hydroxide suspension is of about 7 in step a).

8. The method of claim 1, wherein the inorganic acid is hydrochloric acid.

9. The method of claim 1, wherein the hydrothermal treatment is performed in an autoclave at a temperature ranging from 150 to 200° C.

10. The method of claim 9, wherein the hydrothermal treatment is performed in an autoclave at a temperature of about 165° C.

11. The method of claim 9, wherein the hydrothermal treatment in autoclave is performed for a time period ranging from 3 hours to 3 days.

12. The method of claim 1, further comprising an additional grafting step onto the zirconia particle surface of compounds carrying moieties that perform a steric and/or an electrostatic repulsion between the zirconia particles.

13. The method of claim 12, wherein the compounds carrying moieties that perform a steric or an electrostatic repulsion comprise a carboxylic acid, a phosphonic acid or a sulfonic acid function.

14. A method for preparing a zirconia particle composition comprising the preparation of a zirconia particle colloidal solution according to claim 1, and the incorporation of a reactive solvent into the zirconia particle colloidal solution.

15. The method of claim 14, wherein the reactive solvent is a monomer comprising an acrylic or methacrylic function and an alcohol function.

16. The method of claim 15, wherein the reactive solvent is hydroxyethyl methacrylate.

17. The method of claim 14, wherein the zirconia particles are initially in an aqueous medium and the reactive solvent is introduced by redispersing the particles within the reactive solvent.

18. The method of claim 1, wherein the zirconium hydroxide suspension in step a) has a basic pH or a pH of about 7.

* * * * *